United States Patent [19]

Muto et al.

[11] 4,266,181

[45] May 5, 1981

[54] VOLTAGE REGULATOR SYSTEM FOR VEHICLE GENERATOR

[75] Inventors: Katsuya Muto, Kariya; Kazumasa Mori, Aichi; Akira Mase, Handa; Takayasu Nimura, Nagoya; Katsumi Itoh, Obu; Yoshio Akita, Ichinomiya, all of Japan

[73] Assignee: Nippondenso Co., Ltd., Kariya, Japan

[21] Appl. No.: 9,359

[22] Filed: Feb. 5, 1979

[30] Foreign Application Priority Data

Apr. 21, 1978 [JP] Japan .................................. 53-48205

[51] Int. Cl.³ ............................................. H02P 9/08
[52] U.S. Cl. ...................................... 322/28; 322/60; 320/64
[58] Field of Search ................. 322/28, 60, 73, 86–88; 320/64, 68

[56] References Cited

U.S. PATENT DOCUMENTS

| | | | |
|---|---|---|---|
| 3,496,443 | 2/1970 | Snedeker et al. | 322/28 X |
| 3,585,490 | 6/1971 | Zelina | 322/88 X |
| 3,820,009 | 6/1974 | Itoh et al. | 322/28 |
| 3,843,921 | 10/1974 | Hill | 320/64 X |

*Primary Examiner*—Robert J. Hickey
*Attorney, Agent, or Firm*—Cushman, Darby & Cushman

[57] ABSTRACT

A semi-conductor voltage regulation system for a vehicle includes engine rise-up detection circuit and an oscillator circuit. The field exciting current is intermittently supplied by the oscillator circuit before the engine starts and continuously supplied after the engine has started so as to minimize battery discharge.

8 Claims, 5 Drawing Figures

VOLTAGE REGULATOR SYSTEM FOR VEHICLE GENERATOR

BACKGROUND OF THE INVENTION

The present invention relates to a voltage regulator for an automotive vehicle generator and, more particularly to an improved control circuit for field exciting current of a battery-excited vehicle generator.

SUMMARY OF THE INVENTION

It is a main object of the present invention to provide an improved voltage regulator system for a vehicle generator which is free from battery discharge even when a key switch is left closed for a long period of time.

It is another object of the present invention to provide a circuit for intermittently supplying field exciting current at a predetermined duty ratio when the engine is not in full operation whereby a current limiting power resistor is eliminated, which is advantageous to forming such a circuit in a small integrated circuit chip.

Other objects and features will be readily apparent from the following description and drawings.

DESCRIPTION OF THE PREFERRED EMBODIMENT

Figure 1:
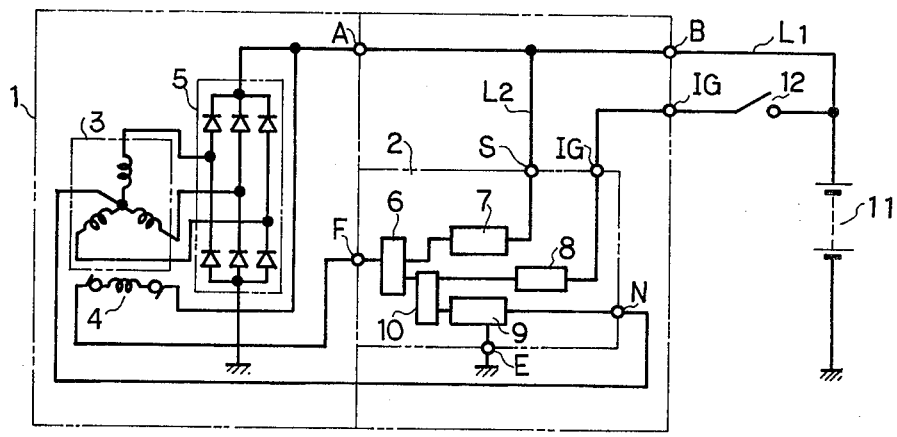
FIG. 1 is a circuit diagram showing a whole voltage regulator system according to the present invention.
Figure 2:
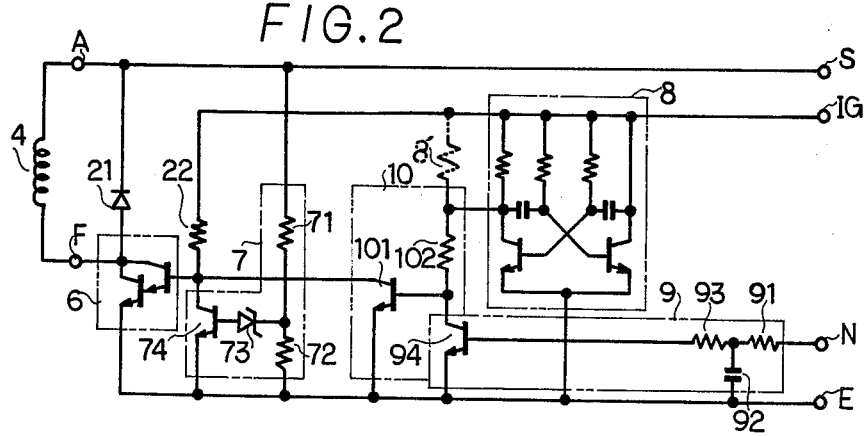
FIG. 2 is a main part of the above system according to the present invention.
Figure 3:
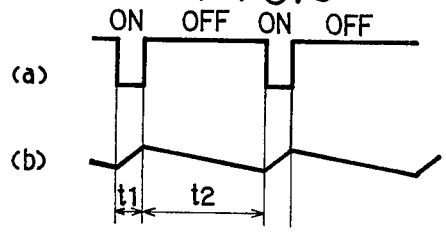
FIG. 3 is a graph of wave forms for illustrating operation of a control circuit according to the present invention.
Figure 4:
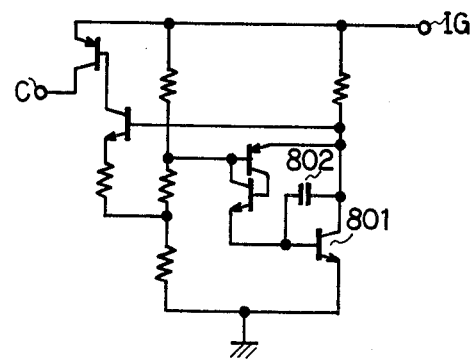
FIG. 4 and FIG. 5 are, respectively, circuit diagrams for different types of control circuits according to the present invention.
Figure 5:
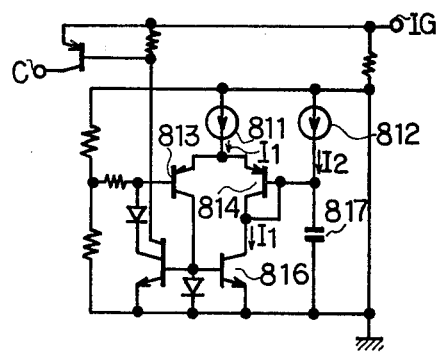

A system according to the present invention will be described with reference to FIGS. 1 and 2. The system is generally comprised of a generator 1 and a voltage regulator circuit 2. The generator 1 is of a well-known type and has Y-connected three phase armature windings 3, a field coil 4 and a full wave-three phase rectifier 5. The voltage regulator circuit 2 includes a well known type switching circuit such as a Darlington transistor 6 the collector-emitter path of which is connected in series with the field exciting coil, a voltage detecting circuit 7 for detecting a battery voltage to control the switching circuit 6, an oscillating circuit 8 such as an astable multivibrator as shown in FIG. 2 or others as shown in FIG. 4 and 5 which generates oscillating signals at a predetermined frequency and duty ratio of conducting period and nonconducting period as shown in (a) of FIG. 3 when a key switch 12 is thrown to be closed until the engine rises up to its operation, rise-up voltage detecting circuit 9 for detecting the rise-up of the engine to interrupt the oscillating signal transmitted from the oscillating circuit 8 and a switch driving circuit 10 for driving the switching circuit 6 in response to the oscillating signal. The frequency and duty ratio is determined so that the generator may be excited by a minimum field exciting current at the engine rotation in practical use, 1,000 RPM for example. A battery 11 is connected to an output terminal A of the generator 1 through a terminal B on a line $L_1$. An ignition switch 12 is adapted to energize the oscillating circuit 8 when it is closed.

As shown in FIG. 2, the collector of the Darlington transistor 6 is further connected to a freewheel diode 21 which is in parallel with the field exciting coil 4 and the base of Darlington transistor 6 is connected to the voltage detecting circuit 7 and a terminal IG through a resistor 22. The voltage detecting circuit 7 consists of voltage dividing resistors 71 and 72, a zener diode 73 and a transistor 74. One end of the resistor 71 is connected to a terminal S which is in turn connected through line $L_2$ to the terminal B. Other connections are well known in the art. The base of the Darlington transistor 6 is also connected to the collector of a transistor 101 of the switch driving circuit 10. The switch driving circuit 10 comprises, besides the transistor 101, a resistor 102 connected between the output terminal of the oscillating circuit 8 and the base of the transistor 101, which is in turn connected to the collector of an output transistor 94 of the rise-up voltage detecting circuit 9. The rise-up voltage detecting circuit 9 further includes resistors 91 and 93 and a capacitor 92 for smoothing the voltage applied across its input terminal N and earth terminal E. The input terminal N is connected to the neutral point of the Y-connected armature windings 3 as shown in FIG. 1.

In operation, when the key switch is closed and a starter (not shown) is driven to start an internal combustion engine of a vehicle, the oscillator 8 is energized to generate oscillating signals. As a result, the switch driving circuit 10 makes the Darlington transistor 6 conductive and nonconductive cyclically in response to the oscillating signal to supply the field exciting current in the manner shown in (b) of FIG. 3. As the engine starts and increases its rotational speed, the voltage generated in the armature windings 3 increases gradually and, consequently, the voltage at the neutral point increases. Such a voltage is indicative of an engine operating condition and is applied to the base of the transistor 94 of the rise-up voltage detecting circuit 9 through the smoothing circuit (91, 92 and 93). As far as the voltage at the neutral point is not high enough to render the transistor 94 to be conductive, the Darlington transistor is controlled by the switch driving circuit 10 in the manner described above. When the engine operates and the neutral point voltage increases, the transistor 94 is rendered to be conductive so that the transistor 101 of the switch driving circuit is rendered nonconductive. As a result, the Darlington transistor 6 is kept conductive by the base current supplied through the resistor 22 and the generator 1 is fully excited to increase the output voltage of the generator 3 thereby charging the battery 11.

When the battery voltage further increases, the trannsistor 74 of the voltage detecting circuit 7 controls the Darlington transistor 6 to thereby regulate the battery charging voltage in the well-known manner.

When the engine is stopped while the key switch is still left closed, the field exciting current is intermittently supplied by the Darlington transistor 6 in response to the oscillating signals in the same manner when the starter is driven. However, it should be noted that the field exciting current is limited such that it does not significantly cause discharge of a battery.

In place of the oscillating circuit 8, a resistor 8' (shown in double-dotted chain line in FIG. 2) may be connected between the terminal IG and the resistor 102. In this modified embodiment, the rise-up voltage detecting circuit 9 should be arranged to sense a voltage generated by a residual magnetic flux of the generator field.

In case the key switch is thrown to be closed, but the engine does not rotate the generator, the transistor 94 of the rise-up detecting circuit 9 is in the non-conductive state to thereby cause the transistor 101 of the switch driving circuit 10 to bypass the base current of the Darlington transistor 6 so that the field current may not flow. When the engine is started and rotates the generator 1, a voltage is generated on the neutral point of the armature windings 3 by a residual magnetic flux of the field coil arrangement. As a result, the transistor 94 of the rise-up detecting circuit is caused to be conductive and the transistor 101 is caused to be non-conductive so that the Darlington transistor 6 conducts the full field energizing current.

Since the voltage of the neutral point to be sensed is rather low in this modification, some precaution may have to be taken to prevent the rise-up voltage detecting circuit 9 from mis-sensing noise voltages such as a voltage leaking from battery through the line $L_1$, diodes armature windings and the neutral point if the generator is subject to moisture.

FIG. 4 shows another oscillating circuit generally referred to as a saw tooth wave generating circuit. In the above circuit a transistor 801 and a capacitor 802 are connected to provide a great time constant for the oscillation. FIG. 5 is another oscillating circuit generating triangular wave signals, in which constant current circuits 811 and 812 are provided for charging and discharging a capacitor 817. When the terminal IG is energized, a transistor 814 is rendered to be conductive so that charging current flows through the both constant current circuits $I_1$ and $I_2$ to the capacitor 817. When the voltage of the capacitor 817 reaches a predetermined value, the transistor 814 becomes nonconductive and transistors 813 and 816 become conductive so that the capacitor 817 discharges a constant current ($I_1-I_2$) until the capacitor voltage reaches a predetermined value at which the charging operation starts again. A terminal C is to be connected to the resistor 102 shown in FIG. 2.

What is claimed is:

1. A voltage regulator for battery charging generator having armature windings and a field exciting coil comprising:
   a switching circuit connected in series with the field exciting coil for supplying field exciting current by the conduction thereof,
   a battery voltage sensing circuit for causing said switching circuit to be nonconductive when a sensed battery voltage exceeds a first value to regulate the battery charging voltage,
   first means connected to the armature windings to detect a voltage in said windings, and
   second means for causing said switching circuit to be conductive and nonconductive periodically unless said first means detects that a voltage in said windings exceeds a second value smaller than said first value.

2. A voltage regulator for battery charging generator having a field exciting coil comprising:
   a switching circuit for supplying field exciting current in a controlled manner;
   a battery voltage sensing circuit for controlling the switching operation of said switching circuit in response to the battery voltage;
   an oscillating circuit for generating oscillating signals having a predetermined duty cycle;
   a generator voltage sensing circuit connected to the battery charging generator; and
   a transistor circuit connected to said generator voltage sensing circuit and said oscillating circuit for controlling said switching circuit to switch on and off in accordance with the oscillating signals when the generator output voltage is lower than a predetermined voltage.

3. A voltage regulator for battery charging generator having a field winding and armature windings comprising:
   a switch circuit connected in series with the field winding for supplying said field winding with field exciting current when caused conductive;
   an oscillator circuit for producing oscillation signals at a predetermined frequency;
   a voltage rise-up detecting circuit for producing a detection output signal when a voltage generated by said armature windings exceeds a predetermined value indicative of a substantial operation of said battery charging generator; and
   a control circuit connected to said oscillator circuit and said rise-up detecting circuit for controlling said switching circuit in response to said oscillation signals under the absence of said detection output signal and controlling said switching circuit irrespective of said oscillation signal under the presence of said detection output signal.

4. An apparatus for regulating the voltage produced by a generator having a field coil, said generator being adapted for charging a battery, said apparatus comprising:
   means for controllably applying current to and removing current from said field coil;
   means responsive to the voltage produced by said generator for providing a voltage regulation signal;
   means for distinguishing between an operating stage and a substantially non-operating stage of said generator, and generating a signal indicative thereof;
   means for providing a periodic signal; and
   means responsive to said distinguishing means for enabling said current applying and removing means to respond to said voltage regulation signal during said operating stage, and to respond to said periodic signal during said substantially non-operating stage for minimizing discharge of said battery during said substantially non-operating stage.

5. An apparatus for regulating a direct current voltage produced by a voltage generating device having a field coil excited by a battery, comprising:
   a switching circuit for controllably applying and inhibiting an excitation current to said field coil;
   an oscillator circuit for providing a periodic signal of a predetermined frequency;
   a voltage detection circuit connected to said voltage generating device for sensing when said voltage generating device is substantially operational; and
   a control circuit responsive to said oscillator circuit and to said voltage detection circuit and connected to said switching circuit for controlling the operation thereof, wherein said control circuit is responsive to an output signal of said voltage detective circuit indicative of non-substantial operation of said voltage generating device for controlling the switching of said switching circuit in accordance with said periodic signal, and responsive to an output signal of said voltage detection circuit indicative of substantial operation of said voltage generating device for controlling the switching of said switching circuit in accordance with a respective level of said direct current voltage relative to a predetermined regulation level, the influence of said oscillator circuit being eliminated.

6. The apparatus of claim 5, wherein said voltage generating device is a generator having Y-connected three phase armature windings connected at a neutral point, said voltage detection circuit being connected to said neutral point for sensing the voltage generated in said armature windings.

7. The apparatus of claim 5, wherein the influence of said oscillator circuit is eliminated by blocking said periodic signal.

8. The apparatus of claim 5, wherein said control circuit further comprises:

an another voltage detection circuit connected to said voltage generating device for controlling the switching of said switching circuit in accordance with the respective level of said direct current voltage relative to said predetermined regulation level; and a switch driving circuit connected to said oscillator circuit and to said voltage detection circuit for controlling the switching of said switching circuit in accordance with said periodic signal when the output of said voltage detection circuit is indicative of non-substantial operation of said voltage generating device, and for blocking said periodic signal when the output of said voltage detection circuit is indicative of substantial operation of said voltage generating device.

* * * * *